United States Patent [19]

Endou et al.

[11] Patent Number: 5,157,534

[45] Date of Patent: Oct. 20, 1992

[54] OPTICAL SCANNER

[75] Inventors: Osamu Endou, Kawasaki; Takayuki Ohsawa, Funabashi; Nobuo Sakuma, Inagi, all of Japan

[73] Assignee: Ricoh Company, Ltd., Tokyo, Japan

[21] Appl. No.: 790,465

[22] Filed: Nov. 12, 1991

[30] Foreign Application Priority Data

Nov. 27, 1990 [JP] Japan .................................. 2-325001

[51] Int. Cl.$^5$ .......................... G02B 26/08; G02B 3/04
[52] U.S. Cl. ..................................... 359/212; 359/223; 359/668; 359/710
[58] Field of Search ............... 359/205, 219, 196–198, 359/200, 204, 212, 216, 223, 213, 207, 648, 217, 668, 710, 840

[56] References Cited

U.S. PATENT DOCUMENTS

| 4,253,724 | 3/1981 | Minoura et al. | 359/218 |
| 4,310,757 | 1/1982 | Check, Jr. et al. | 359/217 |
| 4,578,688 | 3/1986 | Okuno | 359/218 |
| 4,627,685 | 12/1986 | Sakuma | 359/205 |
| 4,720,632 | 1/1988 | Kaneko | 250/235 |
| 4,796,964 | 1/1989 | Connell et al. | 359/206 |
| 5,066,083 | 11/1991 | Makino et al. | 359/213 |

*Primary Examiner*—Bruce Y. Arnold
*Assistant Examiner*—James Phan
*Attorney, Agent, or Firm*—Oblon, Spivak, McClelland, Maier & Neustadt

[57] ABSTRACT

An optical scanner has a light source device; a lens for converging a laser beam emitted from the light source device; a deflector having a mirror face which is integrally formed with the shaft of a scanner motor and is constructed by one convex spherical or cylindrical mirror face having a radius R and approximately arranged in the vicinity of a center of rotation of the shaft of the scanner motor; and a scanning face scanned by a light beam deflected by the deflector. The optical scanner satisfies a predetermined relation with respect to the radius R when a distance $L_O$ from a deflecting point to the scanning face at an angle of rotation of the deflector set to zero is equal to a distance L from the deflecting point to the scanning face at the angle of rotation of the deflector set to $\theta$. The predetermined relation is provided by the following formula:

$$R = \{(1/\cos\theta) + \cos\theta/(1-\cos\theta) - 1\}L_o$$

The light source device uses an element for emitting two or more light beams.

9 Claims, 3 Drawing Sheets

OPTICAL SCANNER

BACKGROUND OF THE INVENTION

1. Field of the Invention

The present invention relates to an optical scanner used in a laser printer, a laser facsimile, a digital copying machine, etc.

2. Description of the Related Art

There are many various kinds of proposed optical scanners in which light from a light source is deflected and scanned by various kinds of deflectors such as a rotary polygon mirror and a pyramidal mirror to scan a scanning face of a scanned medium such as a photosensitive body, etc. These optical scanners are used in optical scanning sections of a laser printer, a laser facsimile, a digital copying machine, etc.

In a deflector such as the rotary polygon mirror used in the optical scanners, field curvature is caused when an angle of deflection of light is set to be large at the times of deflecting and scanning operations. It is necessary to use an optical system such as an f θ lens so as to correct this field curvature. Otherwise, it is necessary to dispose a correcting means for mechanically moving a lens of the optical system arranged before the deflector, etc. Accordingly, the optical scanners are large-sized and are increased in cost. In a deflector using the pyramidal mirror, there is a disadvantage that the pitch of a light beam is changed in a normal using method of the pyramidal mirror so that it is not easy to use multiple light beams.

SUMMARY OF THE INVENTION

It is therefore an object of the present invention to provide an optical scanner for correcting field curvature without using any correcting optical system such as an f θ lens, and making the optical scanner compact and light in weight.

In accordance with a first structure of the present invention, the above object can be achieved by an optical scanner comprising a light source device; a lens for converging a laser beam emitted from the light source device; a deflector having a mirror face which is integrally formed with the shaft of a scanner motor and is constructed by one convex spherical or cylindrical mirror face having a radius R and approximately arranged in the vicinity of a center of rotation of the shaft of the scanner motor; and a scanning face scanned by a light beam deflected by the deflector; the optical scanner satisfying a predetermined relation with respect to the radius R when a distance $L_O$ from a deflecting point to the scanning face at an angle of rotation of the deflector set to zero is equal to a distance L from the deflecting point to the scanning face at the angle of rotation of the deflector set to $\theta$.

In accordance with a second structure of the present invention, the above object can be achieved by an optical scanner comprising a light source device; a lens for converging a laser beam emitted from the light source device; a deflector having two opposed mirror faces which are integrally formed with the shaft of a scanner motor and are constructed by convex spherical mirror faces having a radius R and approximately arranged in the vicinity of a center of rotation of the shaft of the scanner motor; and a scanning face scanned by a light beam deflected by the deflector; the optical scanner satisfying a predetermined relation with respect to the radius R when a distance $L_O$ from a deflecting point to the scanning face at an angle of rotation of the deflector set to zero is equal to a distance L from the deflecting point to the scanning face at the angle of rotation of the deflector set to $\theta$.

In accordance with a third structure of the present invention, the above object can be achieved by an optical scanner comprising a light source device; an anamorphic lens group for converging a laser beam emitted from the light source device; a deflector having two opposed mirror faces which are integrally formed with the shaft of a scanner motor and are constructed by convex cylindrical mirror faces having a radius R and approximately arranged in the vicinity of a center of rotation of the shaft of the scanner motor; a scanning face scanned by a light beam deflected by the deflector; and an elongated cylindrical lens arranged between the scanning face and the deflector and having refracting power only in a cross scanning direction; the optical scanner satisfying a predetermined relation with respect to the radius R when a distance $L_O$ from a deflecting point to the scanning face at an angle of rotation of the deflector set to zero is equal to a distance L from the deflecting point to the scanning face at the angle of rotation of the deflector set to $\theta$.

In the above first, second and third structures of the present invention, the predetermined relation is provided by the following formula:

$$R = \{(1/\cos\theta) + \cos\theta/(1+\cos\theta) - 1\}L_o$$

Further, in accordance with a fourth structure of the present invention, the light source device uses an element for emitting two or more light beams in the optical scanner having each of the above first, second and third structures.

In accordance with the above first, second and third structures of the present invention, it is possible to provide an optical scanner for correcting field curvature without using any correcting optical system such as an f θ lens, and making the optical scanner compact and light in weight.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an optical scanner in the present invention will next be described in detail with reference to the accompanying drawings.

Figure 1:
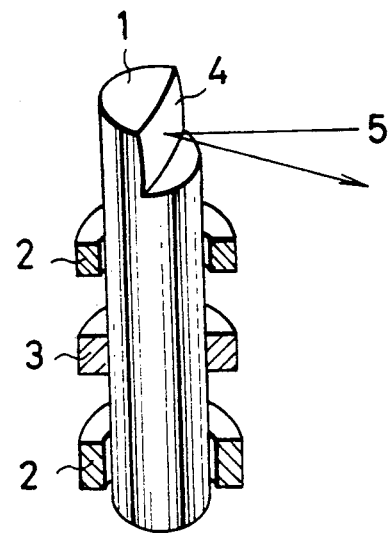
FIG. 1 is a perspective view showing a main portion of a deflector as one example disposed in an optical scanner having a first structure of the present invention.

FIG. 1 shows one example of a deflector disposed in an optical scanner having a first structure of the present invention.

In FIG. 1, a mirror face 4 for deflection and scan is integrally formed with a shaft 1 of a cylindrical scanner motor. This shaft 1 is rotatably supported by a bearing 2 fixed to an unillustrated body of the scanner motor. Magnets are fixed to the shaft 1 of the scanner motor on a circumferential face thereof and are alternately magnetized as N and S poles. The shaft 1 of the scanner motor is rotated by magnetic force generated from an unillustrated electromagnetic coil on a motor body side.

The mirror face 4 integrally formed with the shaft 1 of the scanner motor is constructed by one convex spherical or cylindrical mirror face having a radius R and approximately arranged in the vicinity of a center of rotation of the shaft 1. In FIG. 1, this mirror face 4 is constructed by a spherical face as one example.

In the optical scanner of the present invention, reference numeral $L_O$ designates a distance from a deflecting point to a scanning face when an angle of rotation of a deflector is equal to zero. Reference numeral L designates a distance from the deflecting point to the scanning face when the angle of rotation of the deflector is equal to $\theta$. When the distance $L_O$ is equal to the distance L, the following relation about the radius R is formed:

$$R = \{(1/\cos\theta) + \cos\theta/(1+\cos\theta) - 1\}L_o$$

The reasons for this relation will next be described with reference to FIG. 2.

Figure 2:
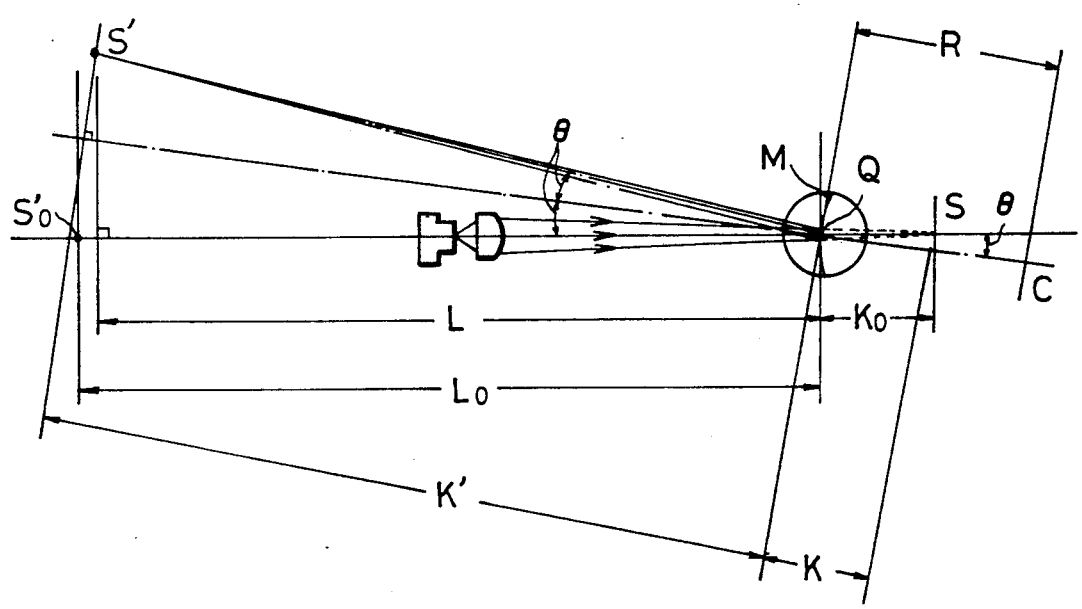
FIG. 2 is a view for explaining deflecting and scanning operations performed by this deflector.

In FIG. 2, a mirror face M is constructed by a spherical or cylindrical face formed around a point C and is rotated around an axis Q.

A scanning light beam is incident onto the mirror face M such that this scanning light beam is converged at a point S. The scanning light beam is then reflected on the mirror face M and is formed as an image at a point S'. In FIG. 2, a point $S_0'$ is an image-forming point provided when the angle $\theta$ of deflection is equal to zero.

A distance between the point $S_0'$ and the axis Q is set to the distance $L_0$. A distance between the axis Q and the foot of a perpendicular drawn from the point S' is set to the distance L. In this case, the distance L is provided as follows:

$$L = (\cos 2\theta / \cos \theta) K'R$$

Reference numeral R designates a radius of curvature of the mirror face M. Reference numeral K' designates a distance from the foot of the perpendicular drawn from the point S' to the axis Q on an extension line connecting the axis Q and the point C to each other. Reference numeral $K_0$ designates a distance between the axis Q and the point S. Reference numeral K designates a distance between the axis Q and the foot of a perpendicular drawn from the point S on a line connecting the axis Q and the point C to each other. In this case, the distances K and K' are provided as follows:

$$K = K_0 \cos\theta$$

$$K' = K\cos^2\theta/(\cos^2\theta - 2K)$$

Accordingly, the distance L is finally provided as follows:

$$L = K_0 R \cos\theta \cos 2\theta / (\cos\theta - 2K_0)$$

When the mirror face M is rotated around the axis Q, a condition for setting the distance L at the angle $\theta$ of rotation of the mirror face M to be equal to the distance $L_0$ at the angle $\theta = 0$ of this rotation is provided as follows:

$$L = L_0 = K_0 R/(1 - 2K_0)$$

Accordingly, the following formula is obtained:

$$1/K_0 = (R/L_0) + 2$$

Therefore, the radius R of curvature of the mirror face M is provided as follows:

$$R = \{(1/\cos\theta) + \cos\theta/(1+\cos\theta) - 1\}L_0$$

The distance L at the angle $\theta$ of rotation of the mirror face M is equal to the distance $L_0$ at the angle $\theta = 0$ of this rotation if the mirror face M is formed by a spherical or cylindrical face having the radius R of curvature satisfying the above formula. In this case, field curvature can be corrected on the scanning face without using any correcting lens.

Figure 3:
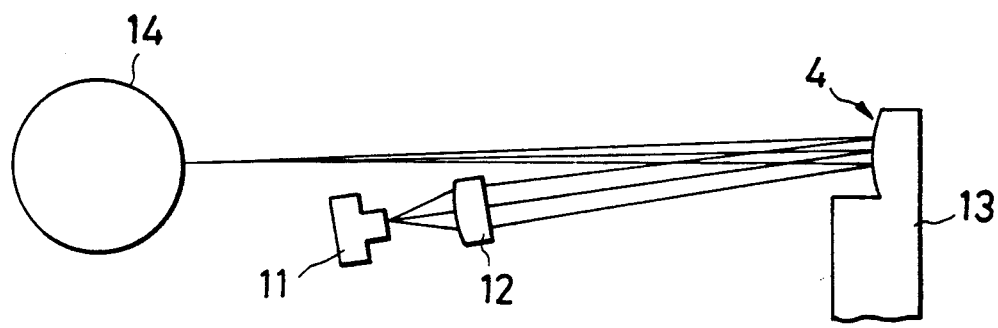
FIG. 3 is a cross-sectional view showing a constructional example of the optical scanner having the first structure and seen in a cross scanning direction.

FIG. 3 is a cross-sectional view showing a constructional example of the optical scanner having the first structure and seen in a cross scanning direction. In FIG. 3, reference numerals 11 and 12 respectively designate a laser diode (LD) and a lens for converging divergent light emitted from the laser diode 11. A deflector 13 is composed of a shaft 1 of a motor and a mirror face 4 integrally formed with this motor shaft 1. Reference numeral 14 designates a photosensitive body.

As mentioned above, to correct field curvature, it is necessary that a light beam is incident onto the mirror face 4 in a direction of the optical axis of a lens system in which an angle of deflection is zero. Therefore, for example, in the optical scanner shown in FIG. 3, the light beam is incident to the mirror face 4 from a position slightly shifted from a main scanning plane in a cross scanning direction. When the mirror face 4 is constructed by a spherical face in the optical scanner shown in FIG. 3, field curvatures in a main scanning direction and the cross scanning direction are in conformity with each other. For example, when the mirror face 4 is constructed by a cylindrical mirror face having curvature only in the main scanning direction, an anamorphic lens group is used as the lens 12 and an elongated cylindrical lens is arranged between the deflector 13 and the photosensitive body 14 to correct the field curvature in the cross scanning direction, etc.

Figure 4:
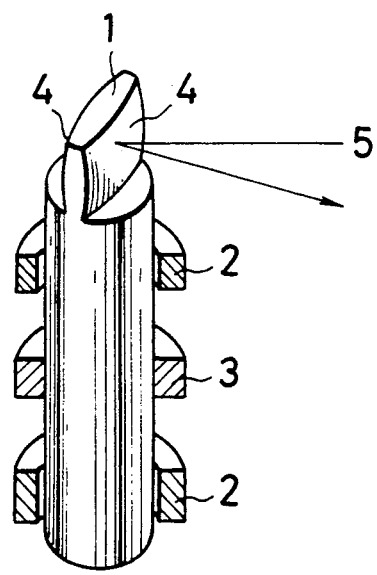
FIG. 4 is a perspective view showing a main portion of a deflector as one example disposed in an optical scanner having a second structure of the present invention.

FIG. 4 shows one example of a deflector disposed in an optical scanner having a second structure of the present invention.

In FIG. 4, a mirror face 4 for deflection and scan is integrally formed with a shaft 1 of a cylindrical scanner motor. This shaft 1 of the scanner motor is rotatably supported by a bearing 2 fixed to an unillustrated body of the scanner motor. Magnets are fixed to the shaft 1 of the scanner motor on a circumferential face thereof and are alternately magnetized as N and S poles. The shaft 1 of the scanner motor is rotated by magnetic force generated from an unillustrated electromagnetic coil on a motor body side.

A mirror integrally formed with the motor shaft 1 has two mirror faces 4 opposed to each other. Each of the two mirror faces 4 is constructed by a convex spherical face having a radius R and is approximately arranged in the vicinity of a center of rotation of the motor shaft 1.

When the deflector has the two mirror faces as shown in FIG. 4, an influence of inclination of each of the mirror faces must considered. However, when the two mirror faces are used in the deflector, it is not difficult to provide an improved accuracy in operation of the mirror without any optical system for correcting the inclination of each of the mirror faces. Further, in this case, no cost of the optical scanner is almost increased.

In the optical scanner having the second structure, the mirror faces, etc. are arranged with rotation symmetry and the optical system is of a post objective type. Accordingly, field curvatures in main and cross scanning directions are in conformity with each other and the above-mentioned relation about angle of rotation, distance, etc. described with reference to FIG. 2 is also formed in this embodiment. Namely, the following relation about the radius R is formed when a distance $L_0$ is equal to a distance L:

$$R = \{(1/\cos\theta) + \cos\theta/(1+\cos\theta) - 1\}L_0$$

In this case, the distance $L_0$ is a distance from a deflecting point to a scanning face when an angle of rotation of the deflector is equal to zero. The distance L is a distance from the deflecting point to the scanning face when the angle of rotation of the deflector is equal to $\theta$. In the optical scanner having such a relation, field curvature is small in each of the main and cross scanning directions.

In the deflector shown in FIG. 4, no centers of rotation of the mirror faces 4 and the motor shaft 1 are accurately conformed to each other. However, the thickness of a mirror portion between the mirror faces 4 is very thin so that an influence of the nonconformity of the center of rotation on the thickness of this mirror portion is small. Accordingly, it is possible to correct field curvature by providing the above relation about the radius R of curvature.

When the deflector has the two mirror faces 4, there are some problems about an influence of inclination of each of the mirror faces, etc. However, such problems can be solved by improving an accuracy in processing of the mirror. When the two mirror faces 4 are used, it is possible to perform deflecting and scanning operations at a high speed since the scanning operation is performed twice per one rotation of the mirror.

Figure 5:
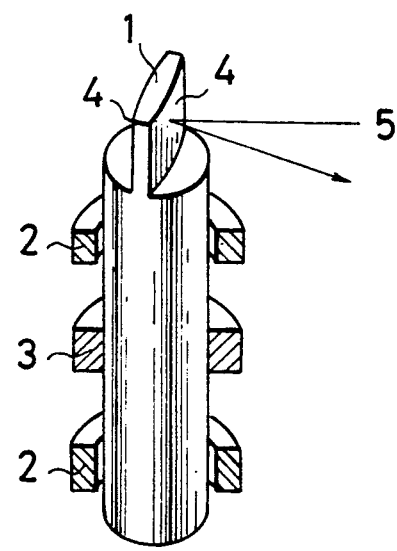
FIG. 5 is a perspective view showing a main portion of a deflector as one example disposed in an optical scanner having a third structure of the present invention.

FIG. 5 shows one example of a deflector disposed in an optical scanner having a third structure of the present invention.

In FIG. 5, constructional members similar to those shown in FIGS. 1 and 4 are designated by the same reference numerals.

In the deflector shown in FIG. 5, a mirror has two mirror faces 4 opposed to each other. Each of the two mirror faces 4 is constructed by a convex spherical face having a radius R and is approximately arranged in the vicinity of a center of rotation of a motor shaft 1. The above-mentioned relation about angle of rotation, distance, etc. described with reference to FIG. 2 is also formed in this embodiment. Namely, the following relation about the radius R is formed when a distance $L_0$ is equal to a distance L:

$$R = \{(1/\cos\theta) + \cos\theta/(1+\cos\theta) - 1\}L_0$$

In this case, the distance $L_0$ is a distance from a deflecting point to a scanning face when an angle of rotation of the deflector is equal to zero. The distance L is a distance from the deflecting point to the scanning face when the angle of rotation of the deflector is equal to $\theta$.

Figure 6:
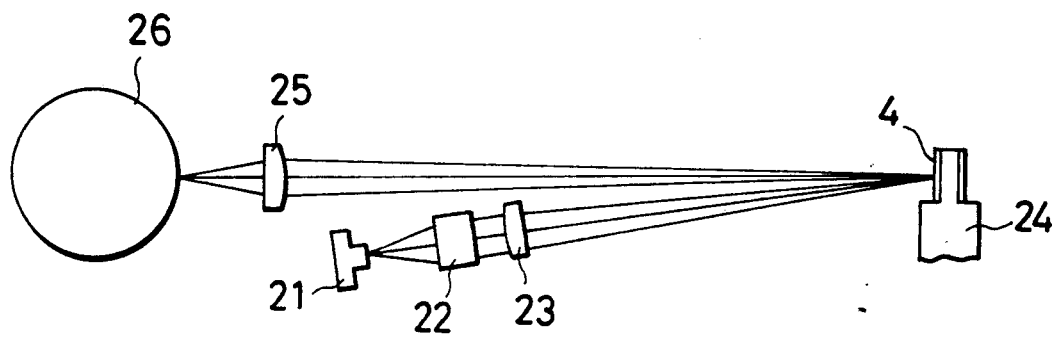
FIG. 6 is a cross-sectional view showing a constructional example of the optical scanner having the third structure and seen in a cross scanning direction.

FIG. 6 is a cross-sectional view showing a constructional example of the optical scanner having the third structure and seen in a cross scanning direction. In FIG. 6, reference numerals 21 and 22 respectively designate a laser diode (LD) and a lens for converging divergent light emitted from the laser diode 21. Reference numeral 23 designates a cylindrical lens. A deflector 24 has two mirror faces 4 integrally formed with a shaft 1 of a motor. Reference numerals 25 and 26 respectively designate an elongated cylindrical lens and a photosensitive body.

In this embodiment, each of the mirror faces 4 of the deflector 24 has a cylindrical shape having curvature only in a main scanning direction, thereby providing an anamorphic optical system. Further, the cylindrical lens 23 having curvature only in a cross scanning direction is used between the converging lens 22 and the deflector 24. Light is focused and formed as an image in the vicinity of the mirror faces 4 of the deflector 24 in the cross scanning direction. Inclination of the mirror faces is corrected by the elongated cylindrical lens 25 arranged between the deflector 24 and the photosensitive body 26. In such an optical system, it is possible to write an image having a high quality by the deflector having the two mirror faces 4 to an extent in which this image is influenced by the inclination of the mirror faces.

In the optical scanner shown in FIG. 6, field curvature in the cross scanning direction is corrected by the elongated cylindrical lens 25. When it is not necessary to correct the inclination of the mirror faces 4, the diameter of a light beam in the cross scanning direction can be adjusted to various kinds of sizes by a combination of the cylindrical lens 23 and the elongated cylindrical lens 25.

Figure 7:
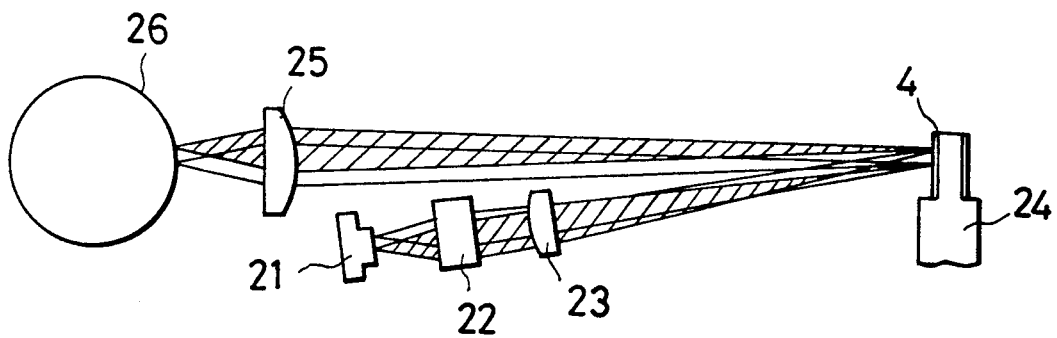
FIG. 7 is a cross-sectional view showing a constructional example of an optical scanner having a fourth structure of the present invention and seen in a cross scanning direction.

FIG. 7 is a cross-sectional view showing a constructional example of an optical scanner having a fourth structure of the present invention and seen in a cross scanning direction.

In the optical scanner shown in FIG. 7, a light source device 21 is constructed by an element emitting laser beams from two points arranged at a certain pitch in a cross scanning direction. The two light beams emitted from the light source device 21 are changed to convergent lights by a converging lens 22. The convergent lights are then focused and formed by a cylindrical lens 23 as an image on a mirror face of a deflector 24 only in the cross scanning direction. For example, the deflector 24 has a cylindrical mirror face 4. The mirror face 4 of the deflector 24 and a photosensitive face of a photosensitive body 26 have a conjugate relation by an elongated cylindrical lens 25. In the following description, reference numeral $\beta$ designates a lateral magnification of the elongated cylindrical lens 25. Reference numeral $u_1$ designates a pitch of the two light beams on the mirror face 4 of the deflector 24. Reference numeral $u_2$ designates a pitch of the two light beams on the photosensitive face of the photosensitive body 26. In this case, $u_2 = \beta u_1$ is formed.

In this embodiment, multiple light beams are used in the optical scanner having the third structure. However, multiple light beams can be similarly used in each of the optical scanners having the first and second structures.

As mentioned above, in the optical scanner having a first structure, a mirror is integrally formed with the shaft of a scanner motor of a deflector. Accordingly, the optical scanner can be made compact and light in weight. Further, field curvature can be corrected without using any correcting lens by providing curvature R for a mirror face.

The optical scanner having a second structure has effects similar to those of the optical scanner having the first structure. Further, in the optical scanner having the second structure, it is possible to write an image at a high speed by using two mirror faces.

The optical scanner having a third structure has effects similar to those of the optical scanner having the first structure. Further, in the optical scanner having the third structure, it is possible to write an image having a high quality by setting the above optical system to an optical system for correcting mirror face inclination. Otherwise, it is possible to provide an optical system having different beam diameters in main and cross scanning directions.

The optical scanner having a fourth structure has effects similar to those of the optical scanner having each of the first, second and third structures. Further, in the optical scanner having the fourth structure, it is possible to write an image at a higher speed by using multiple light beams.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanner comprising:
   a light source device;
   a lens for converging a laser beam emitted from the light source device;
   a deflector having a mirror face which is integrally formed with the shaft of a scanner motor and is constructed by one convex spherical or cylindrical mirror face having a radius R and approximately arranged in the vicinity of a center of rotation of the shaft of the scanner motor; and
   a scanning face scanned by a light beam deflected by the deflector;
   the optical scanner satifying a predetermined relation with respect to the radius R when a distance $L_0$ from a deflecting point to the scanning face at an angle of rotation of said deflector set to zero is equal to a distance L from the deflecting point to the scanning face at the angle of rotation of the deflector set to $\theta$.

2. An optical scanner as claimed in claim 1, wherein the predetermined relation is provided by the following formula:

$$R = \{(1/\cos\theta) + \cos\theta/(1+\cos\theta) - 1\}L_0.$$

3. An optical scanner as claimed in claim 1, wherein the light source device uses an element for emitting two or more light beams.

4. An optical scanner comprising:
   a light source device;
   a lens for converging a laser beam emitted from the light source device;
   a deflector having two opposed mirror faces which are integrally formed with the shaft of a scanner motor and are constructed by convex spherical mirror faces having a radius R and approximately arranged in the vicinity of a center of rotation of the shaft of the scanner motor; and
   a scanning face scanned by a light beam deflected by the deflector;
   the optical scanner satisfying a predetermined relation with respect to the radius R when a distance $L_0$ from a deflecting point to the scanning face at an angle of rotation of said deflector set to zero is equal to a distance L from the deflecting point to the scanning face at the angle of rotation of the deflector set to $\theta$.

5. An optical scanner as claimed in claim 4, wherein the predetermined relation is provided by the following formula:

$$R = \{(1/\cos\theta) + \cos\theta/(1+\cos\theta) - 1\}L_0.$$

6. An optical scanner as claimed in claim 4, wherein the light source device uses an element for emitting two or more light beams.

7. An optical scanner comprising:
   a light source device;
   an anamorphic lens group for converging a laser beam emitted from the light source device;
   a deflector having two opposed mirror faces which are integrally formed with the shaft of a scanner motor and are constructed by convex cylindrical mirror faces having a radius R and approximately arranged in the vicinity of a center of rotation of the shaft of the scanner motor;
   a scanning face scanned by a light beam deflected by the deflector; and
   an elongated cylindrical lens arranged between the scanning face and said deflector and having refracting power only in a cross scanning direction;
   the optical scanner satisfying a predetermined relation with respect to the radius R when a distance $L_0$ from a deflecting point to the scanning face at an angle of rotation of said deflector set to zero is equal to a distance L from the deflecting point to the scanning face at the angle of rotation of the deflector set to $\theta$.

8. An optical scanner as claimed in claimed 7, wherein the predetermined relation is provided by the following formula:

$$R = \{(1/\cos\theta) + \cos\theta/(1+\cos\theta) - 1\}L_0.$$

9. An optical scanner as claimed in claim 7, wherein the light source device uses an element for emitting two or more light beams.

* * * * *